(12) United States Patent
Muskos

(10) Patent No.: US 7,316,432 B2
(45) Date of Patent: Jan. 8, 2008

(54) BUMPER BEAM AND A VEHICLE WITH SUCH A BEAM

(75) Inventor: Per Muskos, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 49 days.

(21) Appl. No.: 10/580,631

(22) PCT Filed: Dec. 8, 2003

(86) PCT No.: PCT/SE03/01847

§ 371 (c)(1),
(2), (4) Date: May 24, 2006

(87) PCT Pub. No.: WO2005/054011

PCT Pub. Date: Jun. 16, 2005

(65) Prior Publication Data

US 2007/0102942 A1    May 10, 2007

(51) Int. Cl.
*B60R 19/02*    (2006.01)

(52) U.S. Cl. ............................ 293/102; 293/120

(58) Field of Classification Search ............... 296/102, 296/120, 187.03, 187.09; 293/102, 120
See application file for complete search history.

(56) References Cited

U.S. PATENT DOCUMENTS

| 5,722,708 | A  | * | 3/1998  | Jonsson ................ 293/102 |
| 6,554,345 | B2 |   | 4/2003  | Jonsson |
| 6,764,117 | B2 |   | 7/2004  | Jonsson |
| 6,836,321 | B2 |   | 12/2004 | DeFelice et al. |
| 2002/0121797 | A1 | * | 9/2002 | Jonsson ................ 296/146.6 |
| 2003/0218341 | A1 | * | 11/2003 | Jonsson et al. ........... 293/102 |

FOREIGN PATENT DOCUMENTS

| SE | 523502  | 4/2004 |
| WO | 9920490 | 4/1999 |
| WO | 0224487 | 3/2002 |
| WO | 0238418 | 5/2002 |

* cited by examiner

Primary Examiner—Joseph D. Pape
(74) Attorney, Agent, or Firm—Mark P. Stone

(57) ABSTRACT

A front bumper beam for a vehicle comprises a hat profile (11,15) with a cover (10) and it has its cover facing forwards. The beam has a central portion (22) with lower profile than its side portions (20,21) and, as distinguished from the side portions, this lower central portion (22) has a reinforcement in the form of a bent edge (23,24) on at least one of the side flanges (14,15) of the hat profile.

4 Claims, 2 Drawing Sheets

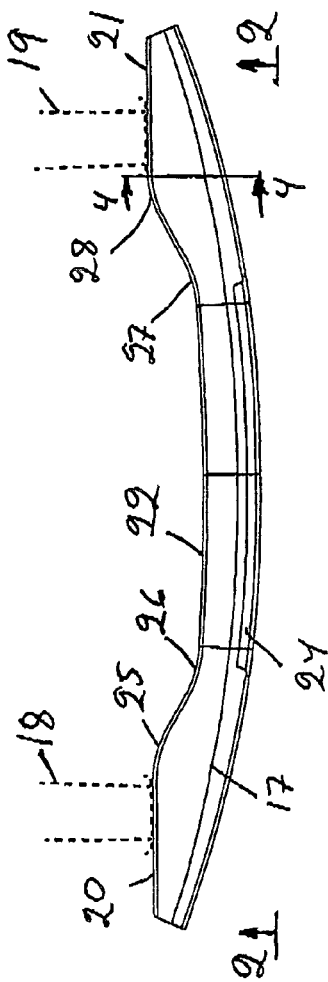
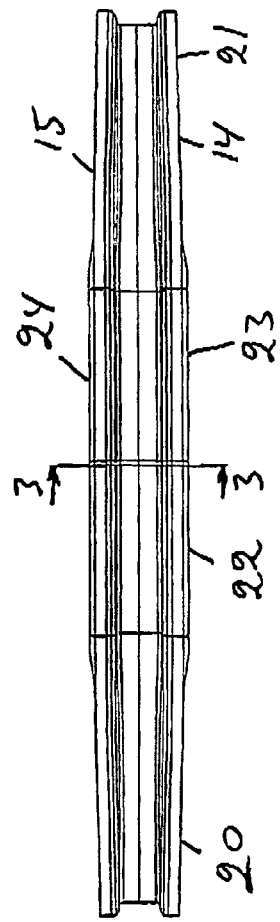
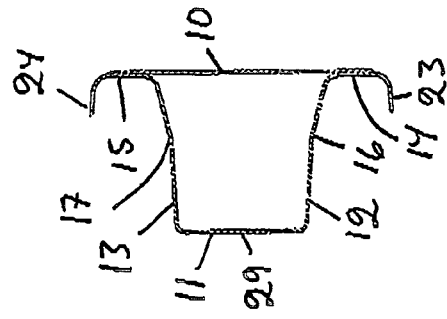
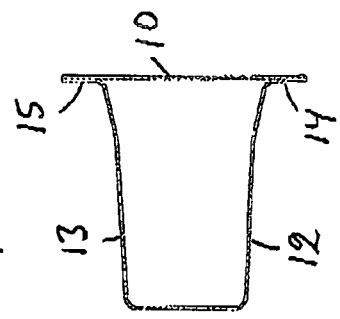

BUMPER BEAM AND A VEHICLE WITH SUCH A BEAM

TECHNICAL FIELD OF THE INVENTION

This invention relates to a bumper beam of high-strength steel, comprising a hat profile with a cover. The invention relates also to a vehicle having such a beam.

TECHNICAL BACKGROUND

Nowadays, bumper beams for passenger cars are usually in high-strength steel and they are usually covered by an outer plastic fascia and therefore, they need not be aesthetically attractive. Therefore, they can be manufactured solely with regard to desired function, but they must be adapted to the space available. The front bumper beam must be adapted to the fact that the vehicle normally has a centrally positioned radiator. The bumper beam should also have as low a weight as possible.

OBJECT OF INVENTION

It is an object of the invention to provide a bumper beam that takes up a high energy relative to its weight and that lengthens the vehicle as little as possible. This is fulfilled generally by a beam that has a central portion (22) with lower profile than the side portions (20,21) and, unlike the side portions, this lower central portion (22) has a reinforcement in the form of a bent edge (23,24) on at least one of the side flanges (14,15) of the hat profile, said edge being bent towards the cover.

BRIEF DESCRIPTION OF THE DRAWINGS

FIG. 1 is a top plan view of a bumper beam according to the invention.

FIG. 2 is a view of the beam seen as indicated by the arrows 2-2 in FIG. 1.

FIGS. 3 and 4 are transverse sections at a larger scale taken along lines 3-3 and 4-4, respectively, in FIG. 1 and they show a cover that is omitted in FIGS. 1 and 2.

Figure 6:
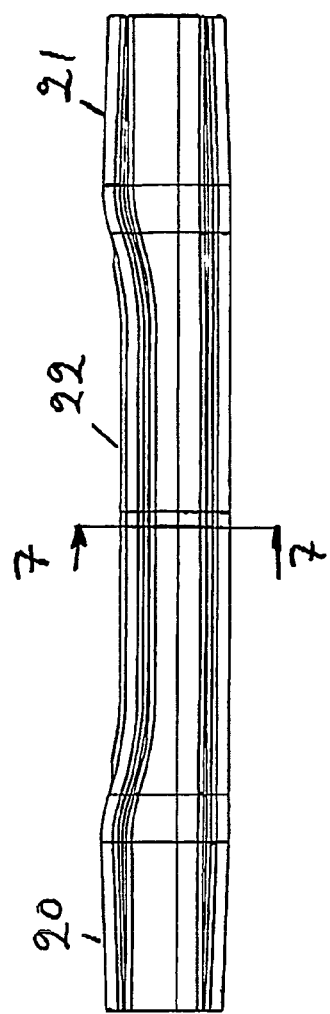
FIG. 6 is a view of the beam seen as indicated by the arrows 6-6 in FIG. 5.
Figure 5:
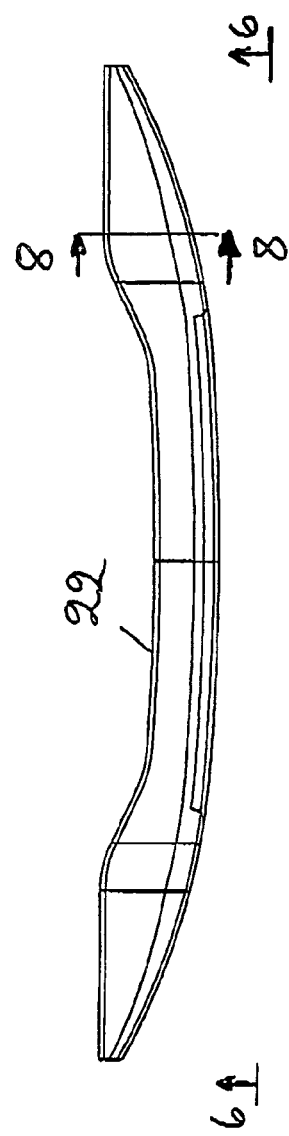
FIG. 5 is a top plan view of a modified bumper beam, also according to the invention.
Figure 7:
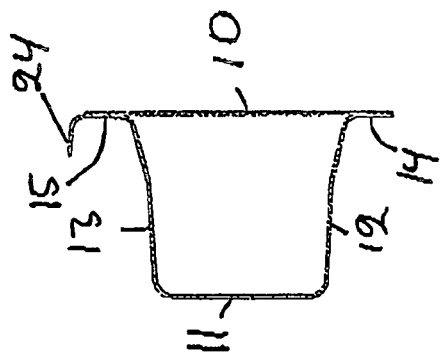
FIGS. 7 and 8 are transverse sections at a larger scale taken along lines 7-7 and 8-8, respectively, in FIGS. 5 and 6 and they show a cover that has been omitted in FIGS. 5 and 6.
Figure 8:
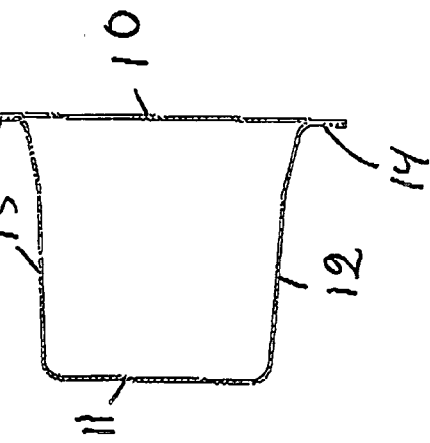

DETAILED DESCRIPTION OF THE ILLUSTRATED AND PREFERRED EMBODIMENTS OF THE INVENTION

The bumper beam illustrated in FIGS. 1-5 has a hat profile with a central flange 11 and two webs 12,13. The webs end in side flanges 14,15. The webs have deformation triggers in the form of "folds" 16,17, which initates a deformation course that provides for the greatest possible energy absorption. The central flange and the two webs form the crown of the hat profile but the crown can be more rounded than illustrated. The hat profile has a cover 10 that makes a closed profile of the beam, preferably a closed profile along the entire hat profile. The cover 10 is not shown on in the FIGS. 1 and 2.

The bumper beam is bow-formed and FIG. 1 shows the bumper beam mounted as a front bumper with the central flange 11 of its side portions 20,21 fastened to the side rails 18,19 of the vehicle so that the open side of the beam faces outwards from the vehicle. The bumper beam is fastened to a supporting portion of the vehicle, for example directly to the side rails as shown or fastened to the side rails through intermediate crash boxes.

The hat profile has its greatest profile height at its side portions 20, 21 as shown in FIG. 4 and it has a central portion 22 with lower profile height, that is, with lower webs 12, 13 as shown in FIG. 3. At the ends outside the fastening to the side rails, the profile height is again reduced since the side flanges have an even bow form. The side flanges 14, 15 are wider at central portion 22 than at the side portions and they have their edges 23, 24 bent in the direction away from the cover. These bent edges reinforce the central portion 22. The side flanges extend in an even bow whereas the central flange 11 has four bends 25-28 and a central relatively straight portion 29 so that the bumper beam makes room for the radiator of the vehicle behind this straight portion 29. The design of the bumper beam makes the steel of the beam deform in a way that provides an effective energy absorption in a crash and reduces the weight of the beam as compared with bumper beams with other designs.

FIGS. 1-4 show a symmetric bumper beam and FIGS. 5-8 show a modified asymmetric bumper beam. The reference numerals are the same in both embodiments of the invention and the embodiment of FIGS. 5-8 is described only for the parts that differ from the embodiment of FIGS. 1-4. For the other parts, see the description of FIGS. 1-4.

The bumper beam according to FIGS. 5-8 has its central flange 11 narrower so that the upper web 13 is withdrawn in the central portion as is best illustrated in FIG. 6. The lower side flange 14 is substantially straight horizontally whereas the upper side flange bends downwardly from the side portions 20,21 towards the central portion 22. This withdrawal may be necessary if the bonnet is very low and the symmetrical bumper beam will not provide for a air intake above the bumper beam. Nowadays, most of the air to the radiator passes below the bumper beam but an additional air passage is often required also above the bumper beam.

When the bumper beam is asymmetric in this way, the deformation will not be symmetric and a bent edge on the lower side flange 14 would not add much to the energy absorption. The upper side flange 15 has its bent edge 24 whereas the lower side flange therefore has no such bent edge. In certain cases, however, one may choose to have a bent edge on both side flanges or only on the lower one.

The hat profile of the bumper beam may suitably be manufactured by the press hardening method in which a blank of a hardenable steel, for example boron steel, is hot stamped in cooled tools and hardened while remaining in the tools with the tools as fixture. Very high strength, for example a yield point of at least 1000 MPa or even up to 1500 MPa, can be reached. The hat profile may also be cold formed in high-strength cold forming steel but as high strengths can then usually not be reached. However, yield points of over 500 MPa can be reached.

The invention claimed is:

1. A bumper beam of high strength steel comprising a hat profile (11-15) with a cover (10), characterised in that the beam has a central portion (22) with a lower height profile than side portions (20, 21)

when viewed in cross section and, unlike the side portions, substantially only the lower central portion (22) has reinforcement in the form of a bent edge (23, 24) on at least one side flange (14, 15) of the hat profile, said edge being bent away from the cover.

2. A vehicle having a front bumper beam mounted with side portions (20, 21) on side rails (18, 19) of the vehicle, the bumper beam comprising a hat profile (11-15) with a cover (10), the cover facing forwards, characterised in that the beam has a central portion (22) with a lower height profile than side portions (20, 21) when viewed in cross section and, unlike the side portions, substantially only the lower central portion (22) has reinforcement in the form of a bent edge (23, 24) on at least one side flange (14, 15) of the hat profile, said edge being bent away from the cover.

3. A vehicle according to claim 2, characterised in that a lower one (14) of the side flanges is straight horizontally whereas an upper one (15) of the side flanges is bent downwardly from the side portions (20, 21) towards the central portion (22) by a crown (11-13) being thinner in the central portion than in the side portions.

4. A vehicle according to claim 3, characterised in that the upper side flange (15) has a bent edge (24) whereas the lower side flange (14) has no such bent edge.

* * * * *